United States Patent [19]
Rabii

[11] Patent Number: 4,975,773
[45] Date of Patent: Dec. 4, 1990

[54] DYNAMIC RANGE VIDEO BLACK LEVEL EXPANDER

[75] Inventor: Khosro M. Rabii, Arlington Heights, Ill.

[73] Assignee: Zenith Electronics Corporation, Glenview, Ill.

[21] Appl. No.: 332,263

[22] Filed: Mar. 31, 1989

[51] Int. Cl.$^5$ .............................................. H04N 5/14
[52] U.S. Cl. .................................... 358/169; 358/164; 358/168
[58] Field of Search ............... 358/169, 168, 164, 39, 358/166

[56] References Cited

U.S. PATENT DOCUMENTS

| | | | |
|---|---|---|---|
| 4,187,519 | 2/1980 | Vitols et al. | 358/169 |
| 4,204,229 | 5/1980 | Hevze | 358/174 X |
| 4,470,067 | 9/1984 | Mino | 358/168 X |
| 4,654,710 | 3/1987 | Richard | 358/39 X |
| 4,712,132 | 12/1987 | Soca | 358/166 X |

Primary Examiner—James J. Groody
Assistant Examiner—Mark R. Powell

[57] ABSTRACT

A digital video signal black level expander in which the dynamic range of the video signal is the criterion for expansion. The digital video signal is compared pixel by pixel in maximum and minimum comparators and the maximum and minimum pixel values for each field are stored in latches. Integrators average the maximum and minimum pixel values over successive pairs of fields of the video signal. The integrated minimum pixel value is subtracted from the integrated maximum pixel value to determine the dynamic range of the pixels in the video signal. A tilt-point pixel value is established as a function of the dynamic range, above which no expansion is permitted. Digital video signals below the tilt point are expanded. Programmable constants are supplied to modify the dynamic range effect and the amount of expansion as desired. A low pass filter removes high frequencies prior to comparing pixel values.

19 Claims, 3 Drawing Sheets

DYNAMIC RANGE VIDEO BLACK LEVEL EXPANDER

Cross Reference to Copending Application

This application is related to, but in no way dependent upon, copending application Ser. No. 290,783, filed Dec. 23, 1988, Now U.S. Pat No. 4,937,671, entitled, DIGITAL VIDEO BLACK EXPANDER, in the name of C. Engel and assigned to Zenith Electronics Corporation.

BACKGROUND OF THE INVENTION AND PRIOR ART

This invention relates in general to digital television systems and in particular to a black expander for a digital video signal in a digital television system.

In the above-described copending application, a digital black expander expands digital video signals that are below an arbitrary breakpoint. That invention, in its preferred embodiment, initially develops a moving average of samples of horizontal video and then samples the horizontal moving average at a field rate to develop field rate samples. The breakpoint is established by adding a constant to the moving average of field rate samples. On the contrary, the present invention method and apparatus ascertain the dynamic range of the digital video signal for each field of video and uses the dynamic range to determine black signal level expansion. In the absence of a dynamic range for the video signal, no black expansion is permitted even though the video signal is below the expansion tilt point. With the system of the invention, black expansion is not performed except under conditions where doing so will provide a benefit to the viewer. The premise is that if the video signal has no dynamic range, or only limited dynamic range, there is no need for black expansion. Indeed, black expansion under uniform signal conditions may be detrimental to the video display. The high frequencies in the luminance signal are removed prior to processing to eliminate rapid transitions which could create annoying flicker in the displayed video.

OBJECTS OF THE INVENTION

It is a principal object of the invention to provide an improved video black level expansion system and method.

Another object of the invention is to provide a novel video black level expansion system and method that operates only when the video display will be enhanced.

BRIEF DESCRIPTION OF THE DRAWINGS

These and other objects and advantages of the invention will be apparent upon reading the specification in conjunction with the drawings, in which.

DESCRIPTION OF THE PREFERRED EMBODIMENT

Figure 1:
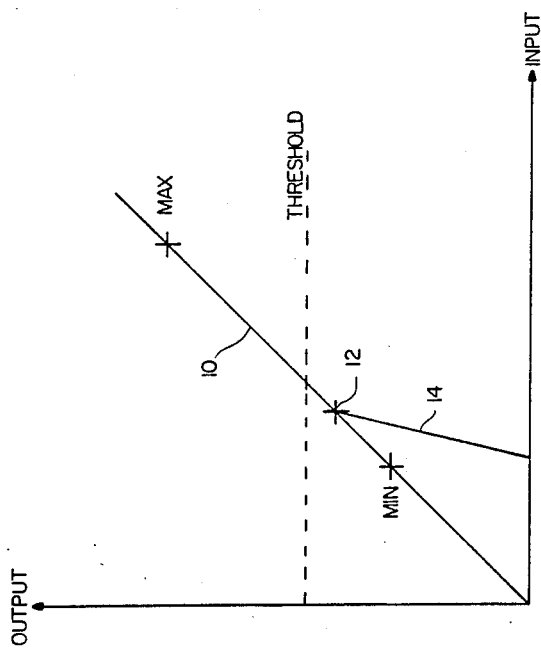
FIG. 1 is a graph indicating the operation of a video black expander.

Referring to FIG. 1, a typical video characteristic curve 10 is modified for black expansion by changing its slope at a tilt point 12, as is represented by curve portion 14. Maximum and minimum levels indicate the spread or dynamic range of the video signal for reference purposes. Video signals above a threshold level are not subject to expansion whereas signals below that level (particularly at and below tilt point 12) are expanded in the black direction. This characteristic is representative of that produced by the circuit disclosed in the copending application mentioned above, where the tilt point (or breakpoint) 12 is established by adding a constant to the estimated darkest portion of the video signal. The dynamic range of the video signal plays no part in the expansion criteria.

The black level expander of the present invention provides a similar translation characteristic except that the tilt point is based upon the dynamic range of the input digital video signal. Specifically, the tilt point Xt is calculated as the product of a programmable constant K1 and a factor D that represents the difference between Xmax and Xmin. Therefore, Xt equals (K1) D, where D is equal to Xmin−Xmin. Xmax and Xmin, in accordance with the invention, are integrated pixel values that are derived over successive fields of the video signal.

Figure 2A:
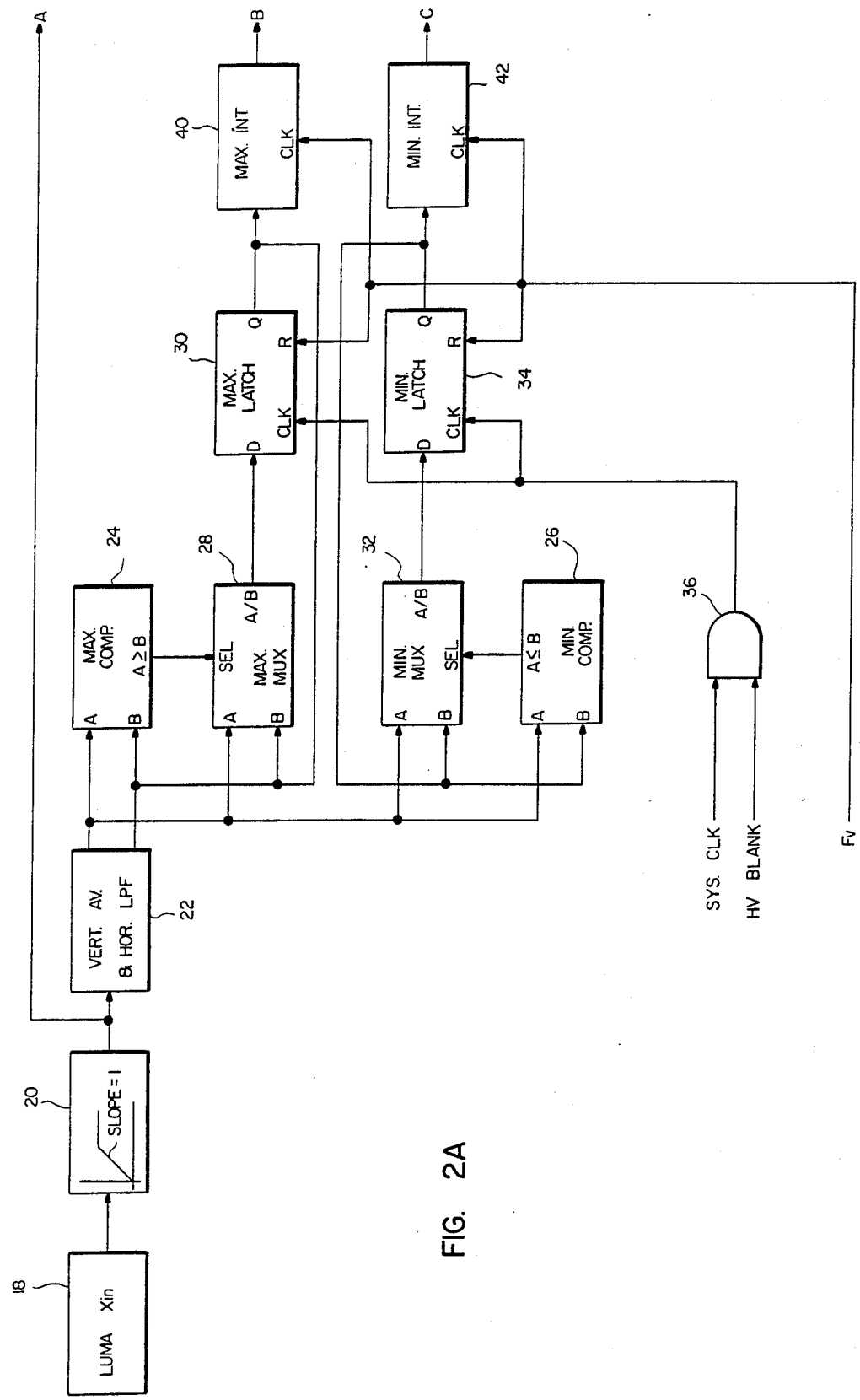
FIGS. 2A and 2B, when combined, are a partial block diagram of a video processor of the invention.
Figure 2B:
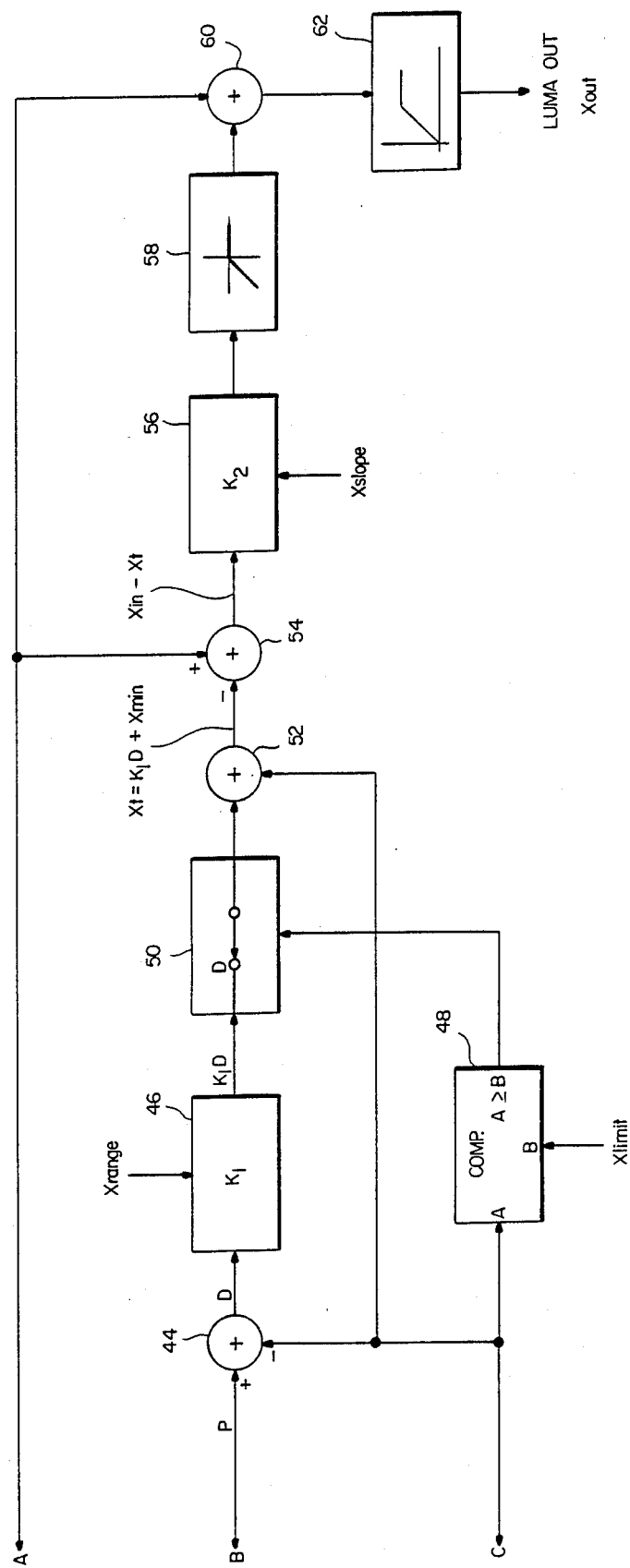

FIG. 2A and FIG. 2B should be positioned with arrows A, B and C in alignment. A source 18 of luminance (LUMA) signal input (Xin) comprises a series of pixels, each represented by 8 bits. The digitized input signal is supplied through a limiter 20 to a vertical average and horizontal low pass filter (LPF) 22 for removing high frequencies. The frequency range of low pass filter 22 is 0 to 1.2 MHz. The frequency limitation removes any rapid transitions in video from the black level expander processor. A practical implementation includes a three line delay with corresponding pixels from each line being averaged by the vertical LPF and supplied as an output to the horizontal LPF. While not essential, this averaging technique prevents misinterpretation of noise on a single line. The output of LPF 22 is coupled to the A inputs of each of a max comparator 24, a min comparator 26, a max multiplexer 28 and a min multiplexer 32. The output of max comparator 24 is applied to the SEL input of max multiplexer 28, the output of which is connected to the D input of a max latch 30.

It will be recognized that, while only a single latch is indicated for simplicity, there are actually eight latches, one corresponding to each bit of the signal Xin. The Q output of max latch 30 is coupled to the B inputs of max comparator 24 and max multiplexer 28. The output of min comparator 26 is similarly coupled to the SEL input of min multiplexer 32, the output of which is connected to the D input of a min latch 34, of which there are also eight. The Q output of min latch 34 is connected to the B inputs of min comparator 26 and min multiplexer 32. Both latches 30 and 34 are clocked only during active video by a signal that is produced by an AND gate 36, the inputs to which are a pixel clock and a horizontal-vertical (HV) blanking signal. A field rate signal is coupled to the reset terminals of max latch 30 and min latch 34, thus resetting the latches for every field of video.

In operation, max latch 30 is reset at the beginning of each video field to all 0's while min latch 34 is reset to all 1's. The 0 value or level of max latch 30 is compared with the value of the first pixel applied to the A input of max comparator 34, which is presumably greater than 0. Comparator 24 therefore selects the A output of max multiplexer 28 so that the first pixel value is coupled to and stored in max latch 30. This process is repeated for each successive pair of pixels and results in a maximum pixel value being stored in max latch 30. A similar process is performed to derive the minimum pixel value, which is stored in min latch 34. Here again, the value or level of the first pixel applied to the A input of min comparator 26 will normally be less than the reset condition of all 1's for min latch 34. The result of the max and min comparisons is that the brightest video pixel and the darkest video pixel values for each video field are stored in max latch 30 and min latch 34, respectively. The output of max latch 30 is coupled to the input of a max integrator 40 and the output of min latch 34 is coupled to the input of a min integrator 42. The max and min integrators 40 and 42 are clocked at a field rate and receive the max and min values from max latch 30 and min latch 34 each field. Each integrator is arranged to add the new maximum (or minimum) pixel value from its respective latch to the existing level in the integrator and to divide the sum by two.

Assuming the max integrator is initially set to zero, the max pixel value (assumed to be 10) from max latch 30 would be added to zero and divided by two to establish the new pixel value of 5 in max integrator 40. In the next video field, the new max latch pixel value (assumed to be 13) is added to the max integrator pixel value of 5 and divided by two to establish a new pixel value of 9 for max integrator 40. The process is repeated for all pixels in the field. A similar process occurs with respect to the min integrator 42. The provision of the integrators effectively desensitizes the dynamic range calculation and precludes black expander operation in response to short term changes in video dynamic range.

The output of max integrator 40 is applied to the positive input of an adder 44 and the output of min integrator 42 is applied to the negative input of adder 44. Effectively, the value of the min integrator 42 output is subtracted from the value of the max integrator 40 output to produce a dynamic range value (D) at the output of adder 44. A multiplier 46 multiplies the dynamic range value D by a factor K1, which is programmable as indicated by the arrow, labelled Xrange, adjacent to multiplier 46. This produces a value (K1) D. Constant K1 is programmable in 16 steps from 1/16 to 1. The output of min integrator 42 is also coupled to the A input of a comparator 48, the B input of which is supplied with a programmable limit value Xlimit. When the minimum value at the output of min integrator 42 is greater than or equal to the limit value Xlimit, comparator 48 develops an output for disabling the black expansion processing system by causing a switch 50 to assume an open position.

With switch 50 in its closed position as shown, the level (K1) D is supplied to the positive input of an adder 52. The value at the output of min integrator 42 is also supplied to a positive input of adder 52 which produces an output, Xt that is equal to (K1) D+Xmin. This value is applied to a negative input of another adder 54. Adder 54 receives, at its positive input, the original digital video signal Xin (from limiter 20). Thus Xt is subtracted from the original signal Xin and applied to another multiplier 56 having a programmable slope factor K2. Slope factor K2 is programmable in eight steps of ¼ each between 7/4 and 0 as indicated by the adjacent arrow labelled Xslope. The output of adder 56 is therefore:

$$K2(Xin-Xt)=K2Xin-K2[K1(Xmax-Xmin)+Xmin].$$

This signal is applied to a limiter 58 having a break at tilt point Xt and an output that is characterized as follows:

If Xin is less than Xt, the output is $K2(Xin-Xt)$.

If Xin is equal to or greater than Xt, the output is 0.

The input signal Xin is added to the output of limiter 58 in another adder 60 which provides a processed output luminance signal after further conventional limiting in a limiter 62, characterized as follows:

If Xin is less than Xt, the output is $K2(Xin-Xt)+Xin$.

If Xin is equal to or greater than Xt, the output is Xin.

It is thus seen that for values of Xin that are greater than or equal to the tilt point Xt, the original response curve or transfer characteristic is followed. However, for values of Xin that are less than the tilt point Xt, the response curve is modified such that $Xout=K2(Xin-Xt)+Xin$. Since $Xt=K1$ times $D+Xmin$, the tilt point is a function of the dynamic range of the video signal.

Figure 3:
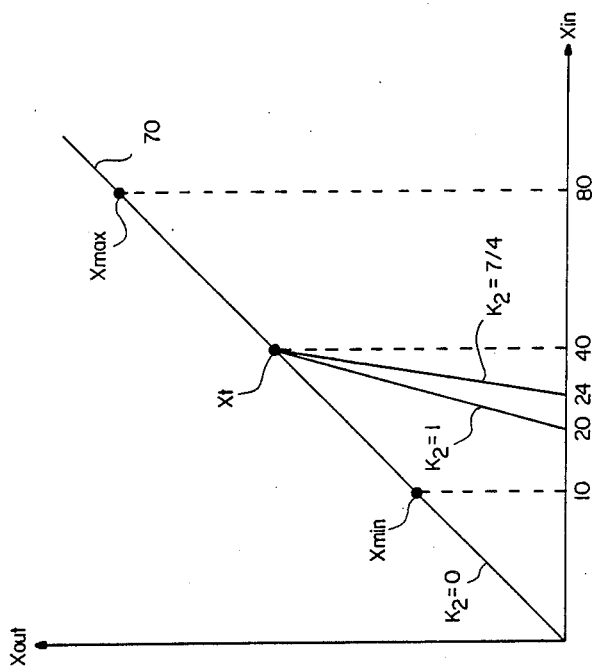
FIG. 3 is a graph indicating operation of the video black expander of the invention.

With reference to FIG. 3, any value of Xin that is greater than or equal to 40 will follow curve 70 and produce an output Xout=Xin. For values of Xin less than 40, the response will follow curves having different slopes depending upon the value of the slope factor K2. For example, if K2=0, Xout will always equal Xin, that is, the response curve will be coincident with curve 70. If K2=1 and Xin=20, then Xout=0 as represented by the curve marked K2=1. If K2=7/4, then Xout would be 0 for all Xins up to approximately 24.

Consequently, with the invention, black level expansion is performed only when there is a dynamic range to the video signal. The degree or amount of dynamic range determines the tilt point in a direct fashion such that the larger the dynamic range, the higher the tilt point. When the dynamic range D is zero, the tilt point Xt=Xmin, and no expansion occurs. Thus expansion of signals toward black is performed in accordance with the degree to which an apparent improvement in contrast will be most noticeable to the viewer. When the improvement would not be noticeable, i.e., where there is no dynamic range to the signal or where there is only a signal of minimal dynamic range, expansion is not performed (or only performed in a minimal amount). Consequently, with the invention, black expansion is performed under signal conditions where it may be of benefit to the viewer and not performed under other signal situations.

It is recognized that numerous changes and modifications may be made to the preferred embodiment of the invention by those skilled in the art without departing from its true spirit and scope. The invention is to be limited only as defined in the claims.

What is claimed is:

1. A method of processing a digital video signal comprising the steps of:
   determining the dynamic range of said digital video signal;
   establishing a tilt-point digital video signal level as a function of said dynamic range; and
   expanding video signals that are below said tilt-point video signal level.

2. The method of claim 1 wherein said digital video signal is in pixel form and wherein said step of determining said dynamic range comprises the steps of:

determining a maximum pixel value and a minimum pixel value for said digital video signal; and subtracting said minimum pixel value from said maximum pixel value.

3. The method of claim 2, further including the steps of:

comparing successive pixels in said digital video signal to determine the pixel of greatest value and the pixel of least value; and storing said greatest and least values in respective maximum and minimum value latches.

4. The method of claim 3 wherein said dynamic range is determined each field of said digital video signal and further including the step of:

integrating said maximum and minimum pixel values over a plurality of fields.

5. The method of claim 4 wherein a programmable constant is applied to modify the pixel value of said dynamic range.

6. The method of claim 5 wherein said expanded video signals are expanded by a programmable factor.

7. A method of processing a digital video signal to expand near black signal portions comprising the steps of:

comparing successive pixels in said digital video signal to determine maximum and minimum pixel values;

subtracting said minimum pixel value from said maximum pixel value to determine the dynamic pixel range of said video digital signal;

establishing a tilt-point video pixel value that is dependent upon said dynamic pixel range;

supplying said digital video signal without expansion for signal portions above said tilt-point value; and expanding signal portions below said tilt-point value by a predetermined factor.

8. The method of claim 7, further including the steps of:

providing maximum and minimum latches for storing said maximum and minimum pixel values;

resetting said latches every field of said digital video signal; and integrating said maximum and minimum pixel values over a number of fields of said digital video signal.

9. The method of claim 8 comprising the added step of low pass filtering said digital video signal before said comparison step to eliminate high frequency components.

10. The method of claim 9 comprising the step of adjusting said predetermined factor to adjust the amount of expansion.

11. A digital video signal black expander comprising:

means for determining the dynamic range of a video signal;

means establishing a tilt-point video signal level as a function of said dynamic range; and means for expanding portions of said digital video signal that are below said tilt-point video signal level.

12. The expander of claim 11 wherein said digital video signal comprises a series of pixels and wherein said dynamic range determining means includes:

maximum and minimum comparison means for comparing the levels of successive pixels in said digital video signal and determining maximum and minimum pixel levels; and subtraction means for subtracting said minimum pixel level from said maximum pixel level.

13. The expander of claim 12, further including low pass filter means for removing high frequencies from said digital video signal prior to supplying said digital video signal to said comparison means.

14. The expander of claim 13, further comprising:

maximum and minimum latches for storing said maximum and minimum pixel levels, respectively; and integration means for averaging said maximum and minimum pixel levels over a plurality of fields of said digital video signal.

15. The expander of claim 14, further including means for applying a programmable constant to modify said dynamic range.

16. The expander of claim 15, further including means for applying a programmable constant for changing the amount of expansion.

17. A digital video signal black expander comprising:

means including maximum and minimum comparison means for comparing successive pixels in said digital video signal and determining maximum and minimum pixel levels therein;

maximum and minimum latches for storing said maximum and minimum pixel levels;

integration means for averaging said maximum and minimum pixel levels over a plurality of fields of said digital video signal;

subtraction means for subtracting said integrated minimum pixel level from said integrated maximum pixel level to develop a dynamic range of said pixel levels in said digital video signal;

means establishing a tilt-point level for said digital video signal pixels as a function of said dynamic range; and means for expanding portions of said digital video signal that are below said tilt-point level.

18. The expander of claim 17, further including means for applying a programmable constant to modify said dynamic range.

19. The expander of claim 18, further including means for applying a programmable constant to change the amount of expansion.

* * * * *